United States Patent Office.

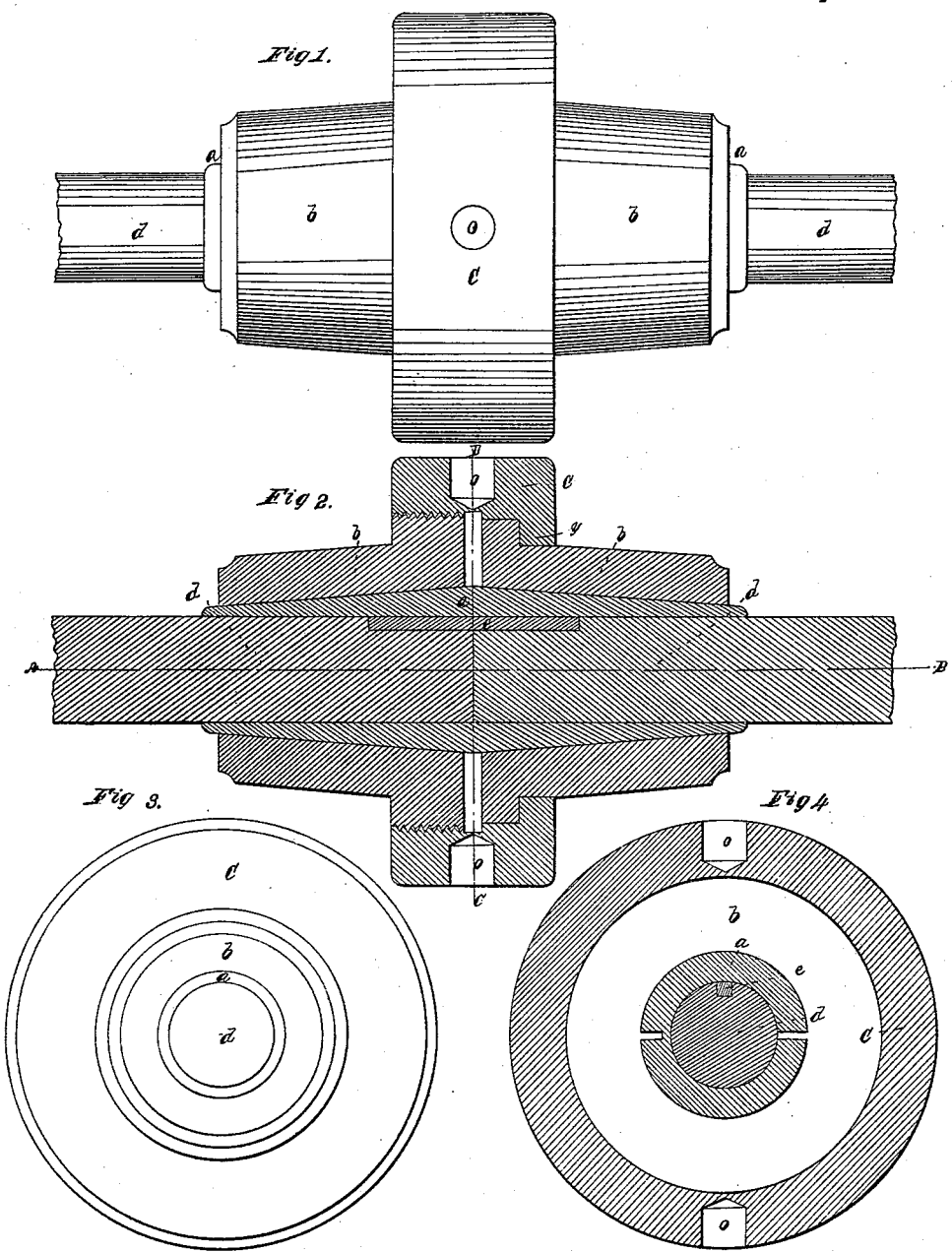

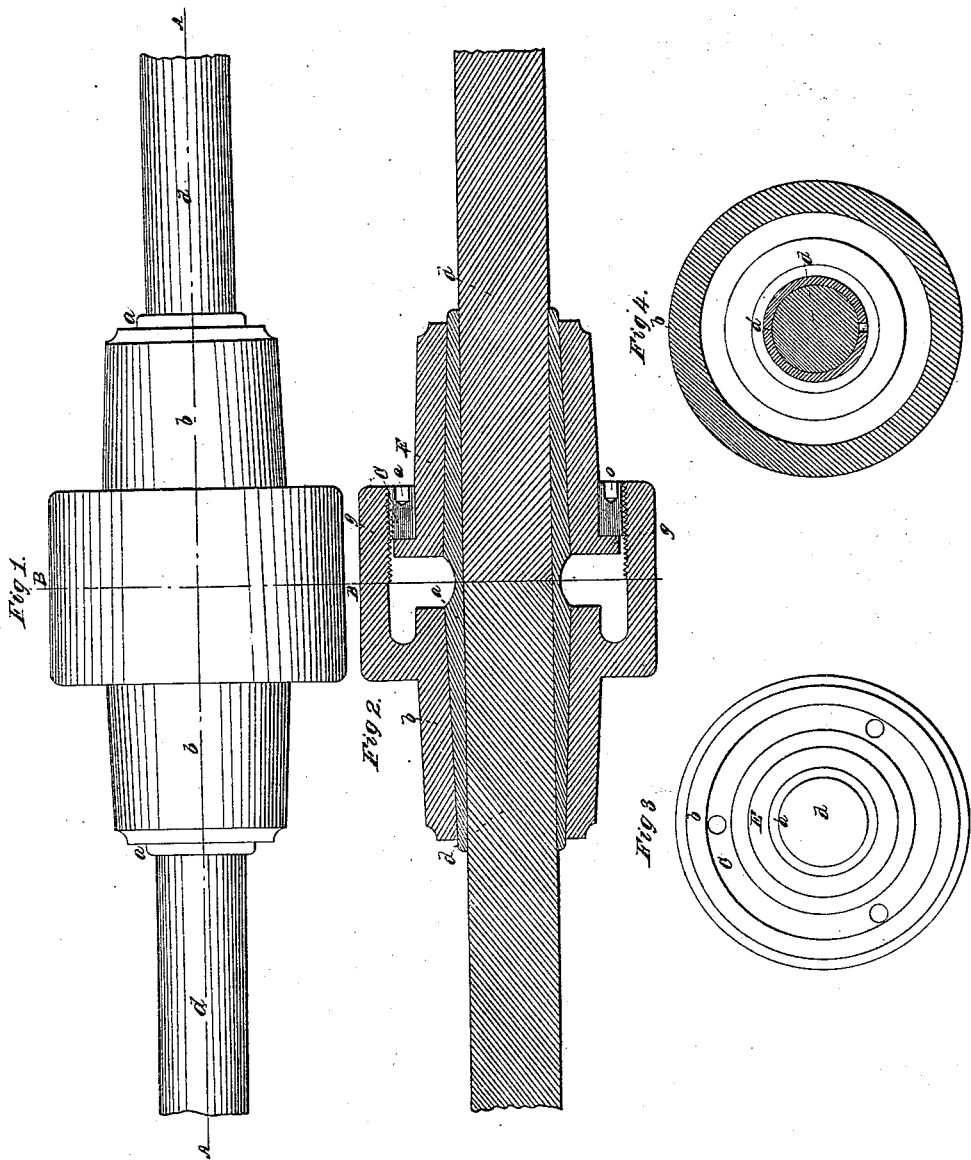

WILLIAM H. DOANE AND JOHN RICHARDS, OF CINCINNATI, OHIO.

Letters Patent No. 65,183, dated May 28, 1867; antedated February 16, 1867.

---

IMPROVEMENT IN SHAFT-COUPLING.

---

The Schedule referred to in these Letters Patent and making part of the same.

---

TO ALL WHOM IT MAY CONCERN:

Be it known that we, WILLIAM H. DOANE and JOHN RICHARDS, of Cincinnati, in the county of Hamilton, and State of Ohio, have invented a new and improved Coupling for Connecting Shafts; and we do hereby declare the following to be a full and exact description of the same, reference being had to the accompanying drawings, forming part of this specification, in which—

Figure 1, sheet B, is a side elevation.
Figure 2, sheet B, a longitudinal section.
Figure, 3, sheet B, an end elevation; and
Figure 4, sheet B, a cross-section on line C' D'.
Figures 1, 2, 3, and 4, on sheet A, show similar views of a different modification of the same coupling.
Similar letters of reference on the different figures indicate corresponding parts.

The nature of this invention consists in constructing a shaft-coupling with an internal split sleeve with conical exterior, constructed sufficiently thin and light in its cross-section to be compressed concentrically to fit shafts of slightly varying diameters, and in so constructing the outer or compressing shells that the strain will fall equally on each end, so connecting them that they will represent the continued strength of shafts through the coupled point. Couplings of this class have heretofore been constructed with the internal sleeve to constitute their strength, while the outer shells or compressing mechanism have no connection, and act independently on each end of the sleeve. This involves making the central sleeve surrounding the shaft so heavy and stiff that it can only be closed as two semicircles, and consequently can only fit a shaft of fixed and specific diameter, and when closed upon a smaller shaft has only a line of contact.

In the coupling here illustrated, the shell is made thin, with but little metal in its cross-section, by which means it can be compressed to fit shafts of different diameters, and adapt itself to irregularities incident to turning and finishing; while the outer or compression shells are so connected that they become the real connection between the shafts and represent their continued strength through the coupled point. They are also arranged in such a manner in connecting them that one will draw upon the other, making the compression equal on each shaft. By this arrangement a coupling as a whole can be constructed with less metal and of smaller diameter, for the reason that the internal sleeve, if constructed heavy enough to form the strengh of the coupling, would increase the diameter of the outer shells proportionately without adding to its strength. By connecting and forming a whole of the outer shells any cross strain upon the coupling falls upon the outer ring at its extreme diameter, instead of a central sleeve, making the coupling as strong as the common flange connection.

To enable others skilled in the art to make and use our coupling, we will proceed to describe its mode of construction and manner of operation with the aid of the drawings, reference being had more particularly to sheet B, which is the most common form of construction.

The inner sleeve $a$ is made of brass or other suitable material; being bored true, is split open on one side and grooved in one or more places, as shown at fig. 4, to make it yield with less strain. It is then turned with a taper on both ends from the central to fit the outer or compressing shells $b\,b$. These shells $b\,b$ are bored to a true taper, as shown, and turned on the exterior to fit the connecting-nut C; one having a flange, as shown, the other with a screw-thread working into the thread in the manner shown at fig. 2. By revolving this nut C, it turns loosely upon the flange at $y$, and draws the two shells $b\,b$ together, compressing the sleeve $a$ upon the shafts, holding them firmly. To apply the coupling, the ends of the shafts are brought together, the key $e$ is inserted to prevent the shaft from turning independently, and to communicate the force from one to the other; the shells $b\,b$ are then slipped on, and if necessary may be driven up firmly before putting on the nut C. The ring-nut is then put on and turned up firmly with a spanner or wrench fitting into the holes $o$. By this means the shells $b\,b$ can be drawn up together without revolving upon the sleeves $a\,a$, the taper in their interior be made so as to secure a great amount of pressure upon the sleeve $a$. The drawings on sheet A represent the same coupling with an extension, $g$, cast upon one of the shells, threaded on its interior to receive a ring-nut, C, working against a flange on the shell E; the operation being the same as in other coupling. We have also constructed the same coupling by turning the shell E to fit perfectly inside the extension $g$, and drawing them together with bolts without altering the nature or functions of the coupling, so long as the outer shells are arranged to constitute the strength by such connection.

Having thus described the nature of our invention, we do not claim the use of a split sleeve in a shaft-coupling, neither do we claim the use of conical shells; but what we do claim, and desire to secure by Letters Patent, is—

1. The ring-nut C, for connecting the conical compressing-shells $b\ b$, in a shaft-coupling, in the manner and for the purposes specified.

2. We claim the sleeve $a$, compressing shells $b\ b$, and ring-nut C, of a shaft-coupling, combined and operated in the manner and for the purpose set forth.

W. H. DOANE,
JOHN RICHARDS.

Witnesses:
W. C. HARD,
W. S. KELLEY.